US012668472B2

(12) United States Patent
Chen et al.

(10) Patent No.: US 12,668,472 B2
(45) Date of Patent: Jun. 30, 2026

(54) PALLET TRUCK FOR TRANSPORTING WINDOW-SHAPED PALLETS

(71) Applicant: MULTIWAY ROBOTICS TECHNOLOGY (SHENZHEN) CO., LTD., Shenzhen (CN)

(72) Inventors: Wencheng Chen, Shenzhen (CN); Chaoshun Lv, Shenzhen (CN); Zemin Kuang, Shenzhen (CN); Hongquan Wang, Shenzhen (CN)

(73) Assignee: MULTIWAY ROBOTICS TECHNOLOGY (SHENZHEN) CO., LTD., Shenzhen (CN)

( * ) Notice: Subject to any disclaimer, the term of this patent is extended or adjusted under 35 U.S.C. 154(b) by 348 days.

(21) Appl. No.: 18/531,964

(22) Filed: Dec. 7, 2023

(65) Prior Publication Data

US 2024/0317557 A1 Sep. 26, 2024

Related U.S. Application Data

(63) Continuation of application No. PCT/CN2023/090669, filed on Apr. 25, 2023.

(30) Foreign Application Priority Data

Mar. 21, 2023 (CN) ......................... 202310282230.0

(51) Int. Cl.
*B66F 9/14* (2006.01)
*B66F 9/075* (2006.01)

(52) U.S. Cl.
CPC ............ *B66F 9/14* (2013.01); *B66F 9/07586* (2013.01)

(58) Field of Classification Search
CPC .......... B66F 9/14; B66F 9/07586; B66F 9/12; B66F 9/18; B66F 9/06; B66F 9/065; B66F 9/07559; B62B 3/02; B62B 3/06; B62B 2203/28; B62B 2203/04
USPC .......................................................... 414/667
See application file for complete search history.

(56) References Cited

U.S. PATENT DOCUMENTS 4,027,771 A * 6/1977 Adams .................. B62B 3/0625 280/43.12
6,182,797 B1 * 2/2001 Tebbe ................. B66F 9/07531 187/222
7,744,335 B1 * 6/2010 Cleary .................... B66F 9/065 254/10 R (Continued)

FOREIGN PATENT DOCUMENTS

CN 111056495 A * 4/2020 .......... B66F 9/07559
CN 112390200 A * 2/2021 ................ B66F 9/08

(Continued)

*Primary Examiner* — Sameh Tawfik
(74) *Attorney, Agent, or Firm* — Westbridge IP LLC

(57) ABSTRACT

The present application discloses a pallet truck for transporting window-shaped pallets, comprising a forklift body, a fork arm assembly and two load-bearing wheels. The fork arm assembly is movably arranged on the forklift body. The fork arm assembly has a movement stroke that moves up and down relative to the forklift body. The fork arm assembly comprises two fork arms spaced apart along a width direction of the forklift body. The two load-bearing wheels are respectively movably arranged on each fork arm. In an up and down direction, the load-bearing wheels have a movement stroke close to and away from the fork arms.

9 Claims, 6 Drawing Sheets

(56) References Cited

U.S. PATENT DOCUMENTS

| | | | | |
|---|---|---|---|---|
| 8,757,326 | B2 * | 6/2014 | Hannemann | B66F 9/085 414/785 |
| 10,618,539 | B2 * | 4/2020 | Dunigan | B62B 3/06 |
| 2005/0036880 | A1 * | 2/2005 | Magoto | B62B 3/0612 414/785 |

FOREIGN PATENT DOCUMENTS

| | | | | |
|---|---|---|---|---|
| CN | 112849870 | A | 5/2021 | |
| CN | 115159401 | A | 10/2022 | |
| CN | 218145698 | U | 12/2022 | |
| DE | 4401257 | C2 * | 8/1996 | B62B 3/0612 |
| DE | 202005009591 | U1 | 10/2005 | |
| DE | 102018112568 | A1 | 11/2019 | |

* cited by examiner

PALLET TRUCK FOR TRANSPORTING WINDOW-SHAPED PALLETS

CROSS-REFERENCE TO RELATED APPLICATIONS

The present application is a U.S. continuation of co-pending International Patent Application No. PCT/CN2023/090669 filed Apr. 25, 2023, which claims foreign priority of Chinese Patent Application No. 202310282230.0, filed on Mar. 21, 2023 in the State Intellectual Property Office of China, the contents of all of which are hereby incorporated by reference.

TECHNICAL FIELD

The present application relates to the technical field of forklifts, and in particular to a pallet truck for transporting window-shaped pallets.

BACKGROUND

Pallet truck is a type of forklift that mainly relies on the fork to be inserted into the hole of the pallet to pick up and transfer the pallet and the load above the pallet. However, when the existing pallet truck is inserted into the pallet hole of the window-shaped pallet, the load-bearing wheel at the bottom of the fork will rub against the bottom of the pallet hole of the window-shaped pallet. Over a long period of time, the window-shaped pallet will be damaged and the service life of the window-shaped pallet will be affected.

SUMMARY

The main purpose of the present application is to provide a pallet truck for transporting window-shaped pallets, aiming to solve the problem that when the existing pallet truck is inserted into the window-shaped pallet hole, it easily rubs against the bottom of the window-shaped pallet insertion hole.

In order to achieve the above purpose, the pallet truck for transporting window-shaped pallets proposed by the present application comprises:

a forklift body;

a fork arm assembly, which is movably arranged on the forklift body, wherein the fork arm assembly has a movement stroke that moves up and down relative to the forklift body, and the fork arm assembly comprises two fork arms spaced apart along a width direction of the forklift body; and two load-bearing wheels, which are movably arranged on each fork arm respectively, wherein in an up and down direction, the load-bearing wheels have a movement stroke close to and away from the fork arm.

In one embodiment, the fork arm assembly further comprises a sliding plate, the sliding plate is movably arranged on the forklift body, and the fork arms are arranged on the sliding plate;

the pallet truck for transporting window-shaped pallets further comprises a first driving assembly, the first driving assembly comprises a first fixing part and a first telescopic part that can move relatively up and down, and the first fixing part is fixed on the forklift body, the first telescopic part is fixedly connected to the sliding plate.

In one embodiment, the first driving assembly comprises a first hydraulic cylinder, the first fixing part comprises a cylinder seat of the first hydraulic cylinder, and the first telescopic part comprises a telescopic rod of the first hydraulic cylinder.

In one embodiment, the pallet truck for transporting window-shaped pallets further comprises a first guiding assembly to provide guidance for the sliding plate to move up and down along the forklift body.

In one embodiment, the pallet truck for transporting window-shaped pallets also comprises two first guiding blocks arranged at intervals along the forklift body, and a first guiding groove is formed on the opposite side of each first guiding block that penetrates up and down;

the pallet truck for transporting window-shaped pallets also comprises two first pulley mounting plates, wherein the two first pulley mounting plates are arranged along a width direction of the sliding plate at intervals where the sliding plate is away from the fork arm, wherein a first guiding wheel set adapted to the first guiding groove is provided on the opposite side of the first pulley mounting plate, and the first guiding wheel set is clamped in the first guiding groove;

the first guiding assembly comprises the first guiding groove and the first guiding wheel set.

In one embodiment, the pallet truck for transporting window-shaped pallets also comprises a second driving assembly, the second driving assembly comprises a driving part for driving the load-bearing wheels closer to and away from the fork arm in an up and down direction;

the second driving assembly comprises:

a driving part, the driving part comprises a second fixing part and a second telescopic part that can move relatively up and down, and the second fixing part is fixed on the forklift body;

a transmission structure, which is movably arranged at bottom of the fork arm, wherein the transmission structure comprises a driving end and a connecting end spaced apart from each other, the driving end is configured to drively connect with the second fixing part; and a load-bearing wheel frame, which is rotatably connected to the connecting end of the transmission structure, and the load-bearing wheel is rotatably mounted on the load-bearing wheel frame.

In one embodiment, the transmission structure comprises:

a lifting arm, which is hingedly connected to the fork arm, and the connecting end is formed on the lifting arm;

a connecting arm, which is hingedly connected to the fork arm, and spaced apart from the lifting arm along a length direction of the fork arm;

a pushing rod, one end of which is fixedly connected to a side of the lifting arm away from the load-bearing wheel, and another end is connected to the connecting arm; and a traction block, which is movably arranged on the forklift body in an up and down direction, wherein one end of the traction block is rotationally connected to the pushing rod, and the driving end is formed on a side of the traction block away from the pushing rod.

In one embodiment, the pallet truck for transporting window-shaped pallets also comprises a second guiding assembly to provide guidance for movement of the traction block.

In one embodiment, the second guiding assembly comprises:

two second guiding blocks, which are arranged on the forklift body at intervals along the width direction of the forklift body, and second guiding grooves extending up and down are formed on an opposite sides of each of the second guiding blocks; and two second guiding wheel sets, corresponding to the second guiding grooves, and are rotatably arranged on opposite sides of the traction block, and the traction block is clamped in the second guiding groove through the second guiding wheel set.

In one embodiment, the driving part comprises a second hydraulic cylinder, the second fixing part comprises a cylinder seat of the second hydraulic cylinder, and the second telescopic part comprises a telescopic rod of the second hydraulic cylinder.

Beneficial Effects

In the technical solution of the present application, a fork arm assembly that can move up and down is movable on the forklift body. The fork arm assembly comprises fork arms. A load-bearing wheel is provided at the bottom of the fork arm, and the load-bearing wheel has a movement stroke close to and away from the fork arm. During actual operation, when the fork arms extend into the pallet holes of the window-shaped pallet, the load-bearing wheels retract toward the bottom of the fork arms to avoid friction with the bottom of the pallet. When the fork arm is inserted into the designated position, the load-bearing wheel moves away from the fork arm and contacts the ground again through the gap at the bottom of the window-shaped pallet.

BRIEF DESCRIPTION OF DRAWINGS

In order to more clearly explain the embodiments of the present application or the technical solutions in the prior art, the drawings needed to be used in the description of the embodiments or the prior art will be briefly introduced below. Obviously, the drawings in the following description are only some embodiments of the present application. For those of ordinary skill in the art, without exerting creative efforts, other drawings can also be obtained based on the structures shown in these drawings.

REFERENCE SIGNS

Figure 1:
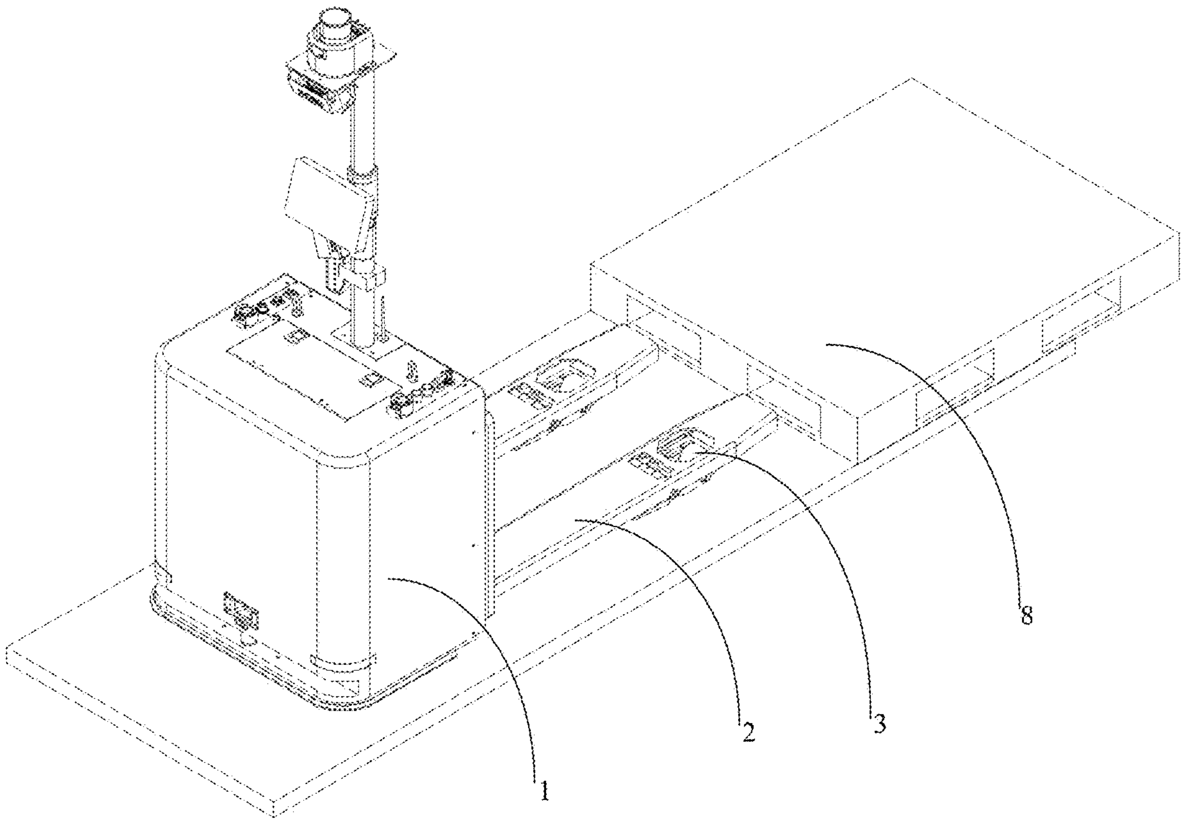
FIG. 1 is a schematic structural diagram of an embodiment of a pallet truck for transporting Window-shaped pallets provided by the present application.

| | | | |
|---|---|---|---|
| 10000 | Pallet truck for transporting window-shaped pallets | 6211 | Hinged end of the wheel arm |
| 1 | Forklift body | 6212 | Hinged end of the rod arm |
| 2 | Fork arm assembly | 6213 | Hinged end of the lifting arm |
| 21 | sliding plate | 622 | Connecting arm |
| 211 | Driving plate | 6221 | Hinged end of the connecting |

-continued

| | | | |
|---|---|---|---|
| | | | arm |
| 22 | Fork arm | 6222 | Hinged end of the arm rod |
| 3 | Load-bearing wheel | 6223 | Driving end of the connecting arm |
| 4 | First driving assembly | 624 | Traction block |
| 4a | First hydraulic cylinder | 63 | Loading-bearing wheel frame |
| 5 | First guiding assembly | 7 | Second guiding assembly |
| 51 | First guiding groove | 71 | Second guiding groove |
| 52 | First guiding wheel set | 72 | Second guiding wheel set |
| 6 | Second drive component | 8 | Window-shaped pallet |
| 61 | Drive department | 81 | Pallet hole |
| 61a | Second hydraulic cylinder | 82 | pallet bottom |
| 62 | Transmission structure | 83 | Gap at the bottom |
| 621 | Lifting arm | | |

The realization of the purpose, functional features and advantages of the present application will be further described with reference to the embodiments and the accompanying drawings.

DETAILED DESCRIPTION

The technical solutions in the embodiments of the present application will be clearly and completely described below in conjunction with the accompanying drawings in the embodiments of the present application. Obviously, the described embodiments are only some of the embodiments of the present application, but not all of the embodiments. Based on the embodiments in this application, all other embodiments obtained by those of ordinary skill in the art without creative efforts fall within the scope of protection of this application.

It should be noted that all directional indications (such as up, down, left, right, front, back . . . ) in the embodiments of the present application are only used to explain the relationship between components in a specific posture (as shown in the drawings), relative positional relationship, movement conditions, etc., if the specific posture changes, the directional indication will also change accordingly.

In addition, descriptions involving "first", "second", etc. in this application are for descriptive purposes only and cannot be understood as indicating or implying their relative importance or implicitly indicating the number of indicated technical features. Therefore, features defined as "first" and "second" may explicitly or implicitly include at least one of these features. In addition, the technical solutions in the various embodiments can be combined with each other, but they must be based on what a person of ordinary skill in the art can implement. When the combination of technical solutions appears to be contradictory or cannot be realized, it should be deemed that such combination of technical solutions does not exist and is not within the protection scope claimed by this application.

Pallet truck is a type of forklift that mainly relies on the fork to be inserted into the hole of the pallet to pick up and transfer the pallet and the load above the pallet. However, when the existing pallet trucks transporting window-shaped pallets are inserted into the pallet holes of the window-shaped pallets, the load-bearing wheels at the bottom of the forks will rub against the bottom of the pallet holes of the window-shaped pallets. Over a long period of time, the window-shaped pallet will be damaged and the service life of the window-shaped pallet will be affected.

In order to achieve the above purpose, the present application proposes a pallet truck for transporting window-shaped pallets, aiming to solve the problem that when the existing pallet truck is inserted into the window-shaped pallet hole, it easily rubs against the bottom of the window-shaped pallet insertion hole.

Please refer to FIG. 1, the pallet truck for transporting window-shaped pallets 10000 comprises: a forklift body 1; a fork arm assembly 2 and two load-bearing wheels 3. The fork arm assembly 2 is movably arranged on the forklift body 1, wherein the fork arm assembly 2 has a movement stroke that moves up and down relative to the forklift body 1, and the fork arm assembly 2 comprises two fork arms 22 spaced apart along a width direction of the forklift body 1; and the two load-bearing wheels 3 are movably arranged on each fork arm 22 respectively, wherein in an up and down direction, the load-bearing wheels 3 have a movement stroke close to and away from the fork arm 22.

Figure 7:
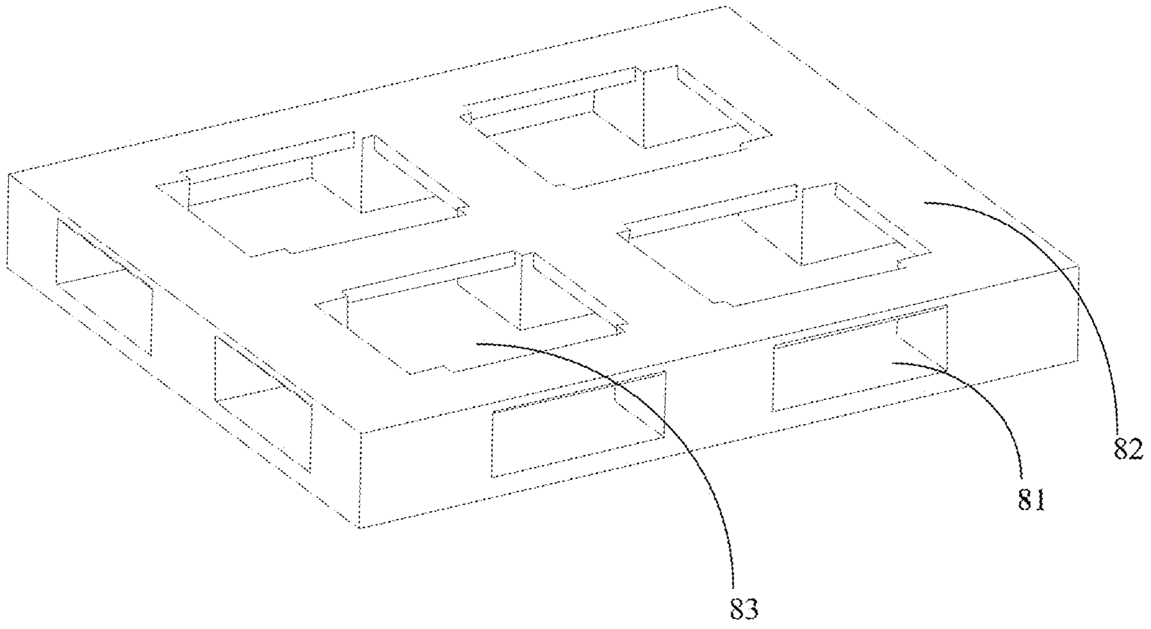
FIG. 7 is a schematic three-dimensional structural diagram of the window-shaped pallet.

In the technical solution of the present application, the forklift body 1 is movable with a fork arm assembly 2 that can move up and down. The fork arm assembly 2 comprises fork arms 22. The bottom of the fork arm 22 is provided with a load-bearing wheel 3. The load-bearing wheel 3 has a movement stroke close to and away from the fork arm 22. During actual operation, please refer to FIGS. 1 and 7, when the fork arms 22 extend into the pallet holes 81 of the window-shaped pallet 8, the load-bearing wheels 3 retract toward the bottom of the fork arms 22 to avoid friction with the pallet bottom 82. When the fork arm 22 is inserted into the designated position, the load-bearing wheel 3 moves away from the fork arm 22 and contacts the ground again through the gap 83 at the bottom of the window-shaped pallet 8.

Figure 2:
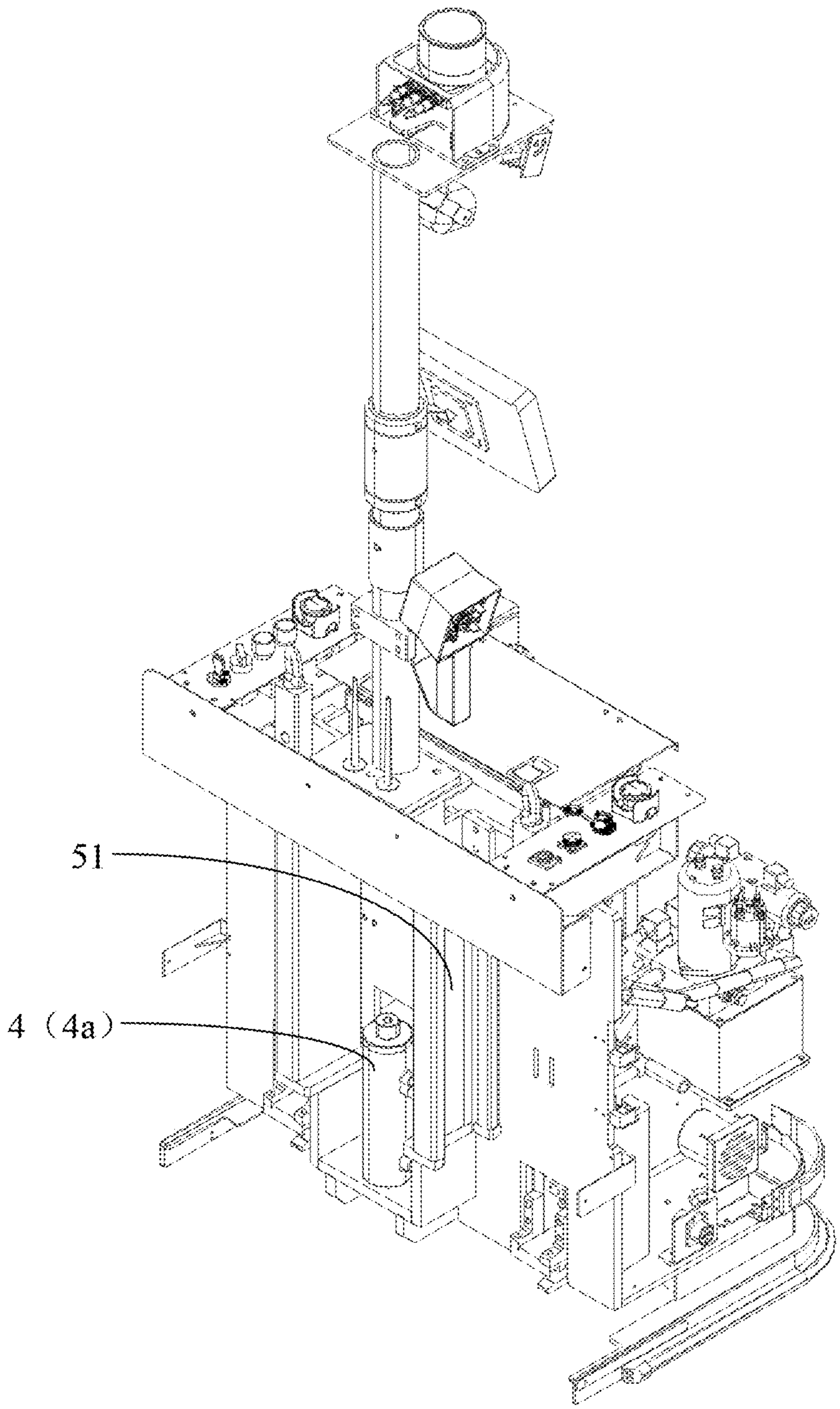
FIG. 2 is a schematic three-dimensional structural diagram of the forklift body in FIG. 1 with the outer shell removed.
Figure 3:
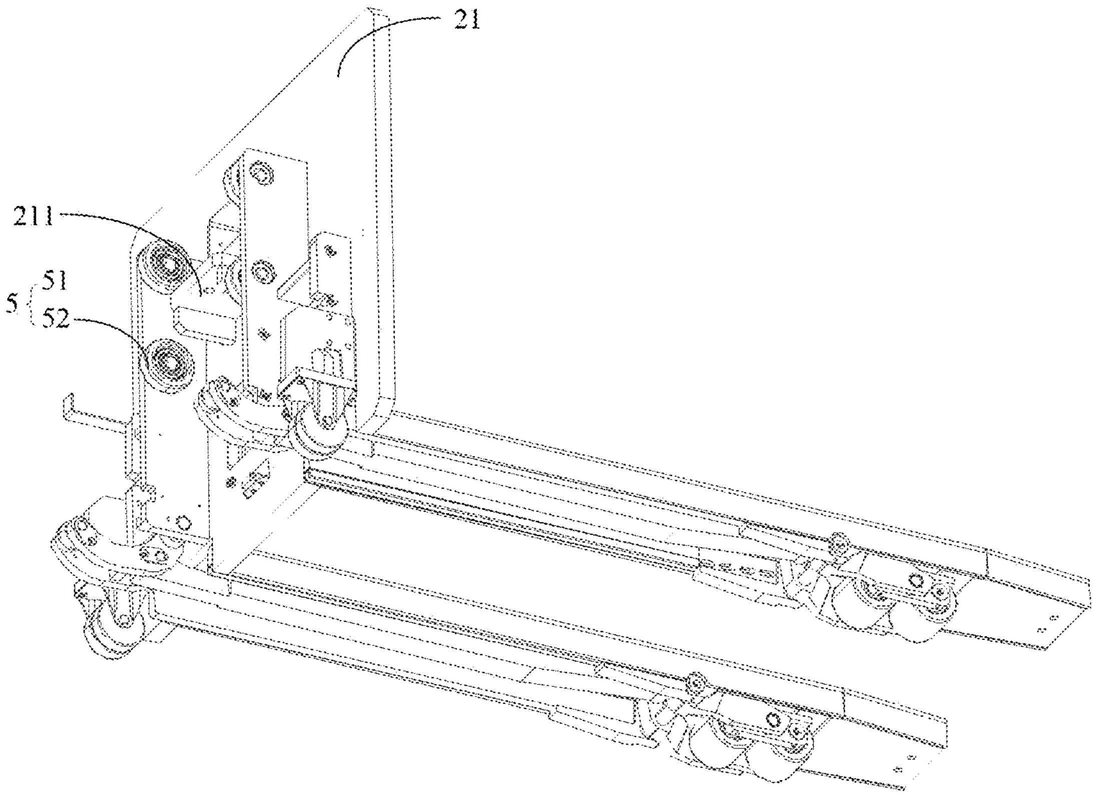
FIG. 3 is a schematic three-dimensional structural diagram of the fork arm assembly in FIG. 1.

In order to drive the fork arm 22 to move up and down, please refer to FIGS. 2 and 3, in an embodiment of the present application, the fork arm assembly 2 also comprises a sliding plate 21, the sliding plate 21 is movably arranged on the forklift body 1, and the fork arms 22 are arranged on the sliding plate 21. The pallet truck for transporting window-shaped pallets 10000 further comprises a first driving assembly 4, the first driving assembly 4 comprises a first fixing part and a first telescopic part that can move relatively up and down, and the first fixing part is fixed on the forklift body 1, the first telescopic part is fixedly connected to a driving plate 211 of the sliding plate 21. In this way, the fork arm 22 is driven to move up and down. Further, the first driving assembly 4 may be a driving cylinder or a driving oil cylinder, which is not limited in the present application. In yet another embodiment of the present application, the first driving assembly 4 comprises a first hydraulic cylinder 4*a*, the first fixing part comprises a cylinder seat of the first hydraulic cylinder 4*a*, and the first telescopic part comprises a telescopic rod of the first hydraulic cylinder 4*a*.

In order to ensure the smooth operation of the fork arm 22, please refer to FIGS. 2 and 3, the pallet truck for transporting window-shaped pallets 10000 provided in the present application also comprises a first guiding assembly 5 to provide guidance for the sliding plate 21 to move up and down along the forklift body 1. The first guiding assembly 5 can be a guiding rail and a sliding block that cooperate with each other, or it can be a guiding rod and a guiding hole, which is not limited in the present application. In one embodiment of the present application, the pallet truck for transporting window-shaped pallets 10000 further comprises two first guiding blocks arranged at intervals along the forklift body 1, and a first guiding groove 51 is formed on the opposite side of each first guiding block that penetrates up and down. The pallet truck for transporting window-shaped pallets 10000 also comprises two first pulley mounting plates, wherein the two first pulley mounting plates are arranged along a width direction of the sliding plate 21 at intervals where the sliding plate 21 is away from the fork arm 22, wherein a first guiding wheel set 52 adapted to the first guiding groove 51 is provided on the opposite side of the first pulley mounting plate, and the first guiding wheel set 52 is clamped in the first guiding groove 51 and can slide up and down along the guiding groove. In this way, a guide is provided for the movement of the sliding plate 21, thereby ensuring the stability of the movement of the fork arm 22.

Figure 4:
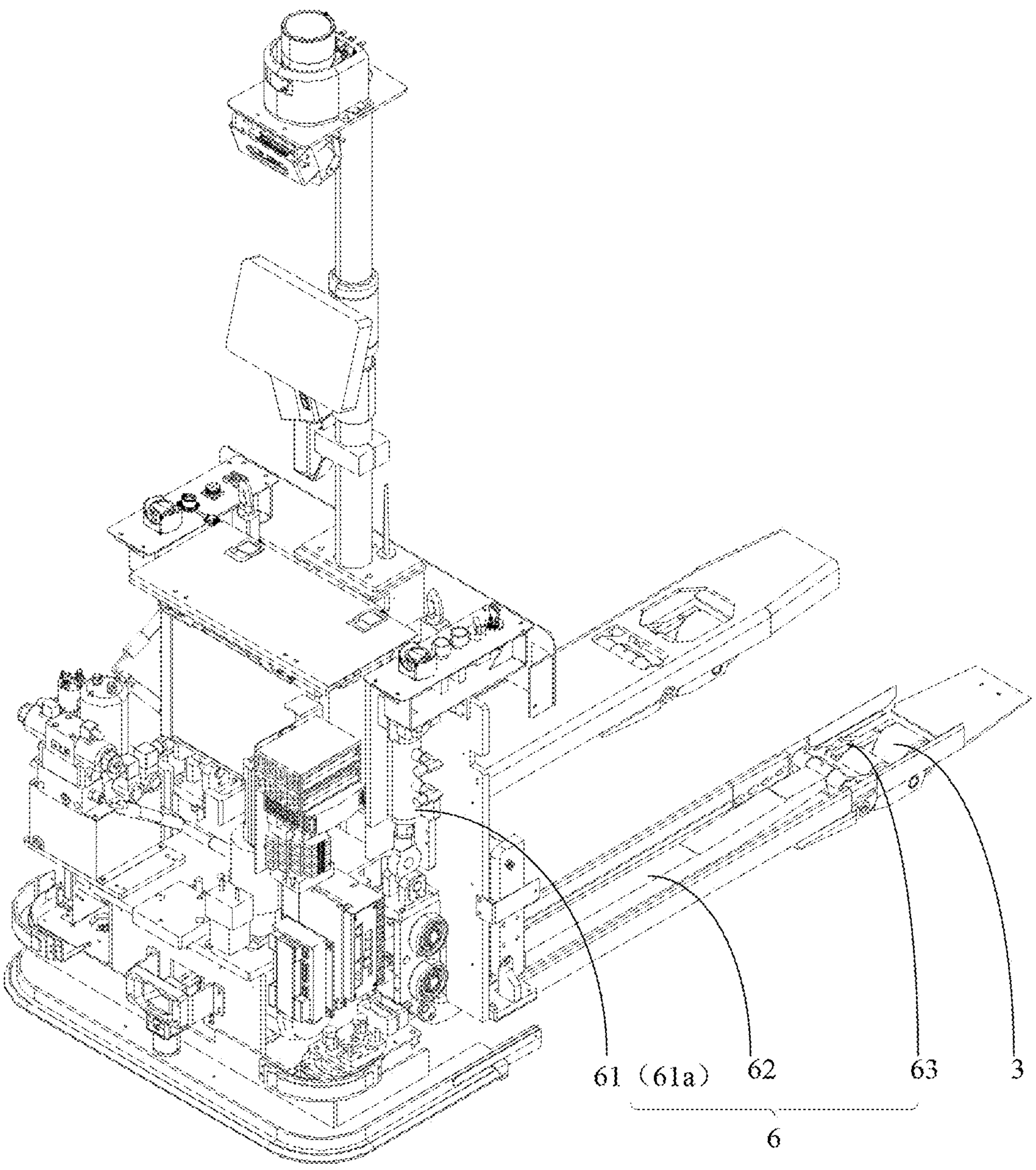
FIG. 4 is a schematic three-dimensional structural diagram of the second driving assembly in FIG. 1.
Figure 5:
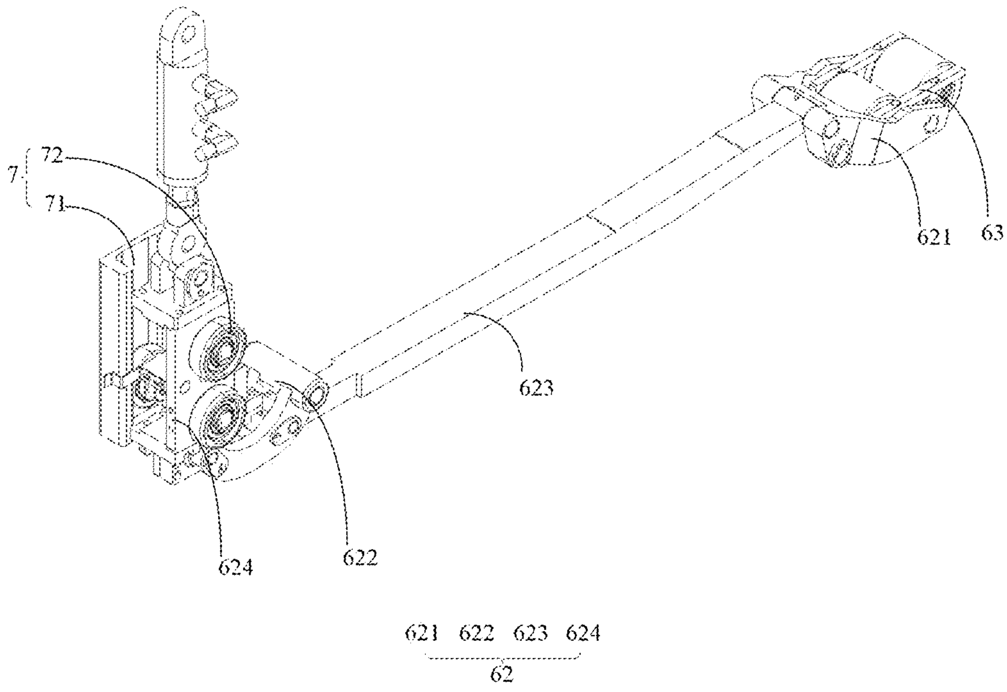
FIG. 5 is a schematic three-dimensional structural diagram of the transmission structure in FIG. 4.
Figure 6:
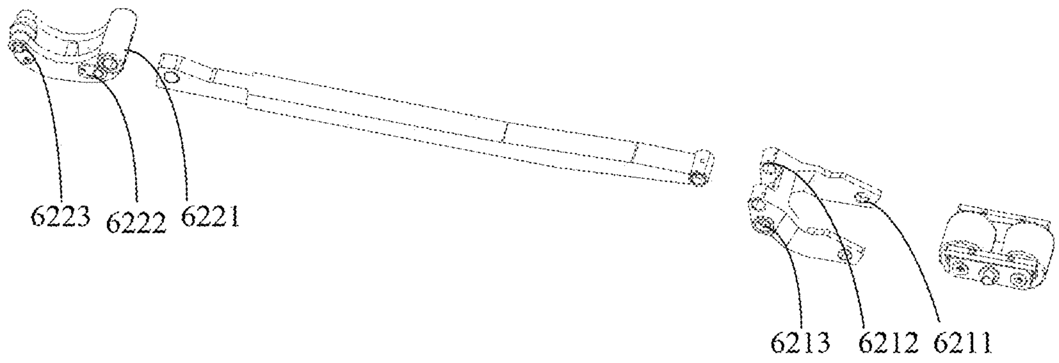
FIG. 6 is an exploded view of FIG. 5.

In order to drive the c load-bearing wheels 3 to move, please refer to FIGS. 4 to 6, in one embodiment of the present application, the pallet truck for transporting window-shaped pallets 10000 further comprising a second driving assembly 6, the second driving assembly 6 comprises a driving part 61 for driving the load-bearing wheels 3 closer to and away from the fork arm 22 in an up and down direction. The second driving assembly 6 comprises: a driving part 61, a transmission structure 62 and a load-bearing wheel frame 63. The driving part 61 comprises a second fixing part and a second telescopic part that can move relatively up and down, and the second fixing part is fixed on the forklift body 1. The transmission structure 62 is movably arranged at bottom of the fork arm 22, wherein the transmission structure 63 comprises a driving end and a connecting end spaced apart from each other, the driving end is configured to drively connect with the second fixing part. The load-bearing wheel frame 63 is rotatably connected to the connecting end of the transmission structure, and the load-bearing wheel 3 is rotatably mounted on the load-bearing wheel frame 63. In actual operation, the driving member can drive the transmission structure to move, thereby driving the load-bearing wheel frame 63 to move, and finally drive the load-bearing wheel 3 mounted on the load-bearing wheel frame 63 to fold and unfold.

In order to realize the driving of the load-bearing wheel frame 63, please refer to FIGS. 5 and 6, the transmission structure 62 comprises a lifting arm 621, a connecting arm 622, a pushing rod 623 and a traction block 624. The lifting arm 621 is hingedly connected to the fork arm 22, and the connecting end is formed on the lifting arm 621. The connecting arm 622 is hingedly connected to the fork arm 22, and spaced apart from the lifting arm 621 along a length direction of the fork arm 22. One end of the pushing rod 623 is fixedly connected to a side of the lifting arm 621 away from the load-bearing wheel 3, and another end is connected to the connecting arm 622. The traction block 624 is movably arranged on the forklift body 1 in an up and down direction, wherein one end of the traction block 624 is rotationally connected to the pushing rod 623, and the driving end is formed on a side of the traction block 624 away from the pushing rod 623. Please refer to FIG. 7 for details, the lifting arm is hingedly connected to the fork arm 22 through a hinged end of the rod arm 6213, is rotatably connected to the pushing rod 623 through the hinged end of the rod arm 6212, and is rotatably connected to the load-bearing wheel through the hinged end of the wheel arm 6211. The connecting arm 622 is hingedly connected to the fork arm 22 through the hinge end of the connecting arm 6221, is rotationally connected to the pushing rod 623 through the hinged end of the arm rod 6222, and is connected to the traction block 624 through the driving end of the connecting arm 6223. In this way, the purpose of realizing the transmission of the load-bearing wheels 3 is achieved.

In order to ensure that the traction block 624 moves smoothly, please refer to FIG. 5, in an embodiment of the present application, the pallet truck for transporting window-shaped pallets 10000 further comprises a second guiding assembly 7 to provide guidance for movement of the traction block 624. The second guiding assembly 7 may be a guide rail and a slide block that cooperate with each other, or it may be a guiding rod and a guiding hole, which is not limited in this application. In an embodiment of the present application, the second guiding assembly 7 comprises two second guiding blocks 71 and two second guiding wheel sets 72. Two second guiding blocks are arranged on the forklift body 1 at intervals along the width direction of the forklift body 1, and second guiding grooves extending up and down are formed on an opposite sides of each of the second guiding blocks. Two second guiding wheel sets 72 correspond to the second guiding grooves, and are rotatably arranged on opposite sides of the traction block 624, and the traction block 624 is clamped in the second guiding groove through the second guiding wheel set 72 and can move along the second guiding groove, thus providing guidance for the movement of the traction block 624.

In order to drive the traction block 624 to move, the driving part 61 may be a cylinder or an oil cylinder, which is not limited in this application. In an embodiment of the present application, the driving part 61 comprises a second hydraulic cylinder 61*a*, the second fixing part comprises a cylinder seat of the second hydraulic cylinder 61*a*, and the second telescopic part comprises a telescopic rod of the second hydraulic cylinder 61*a*.

The above are only preferred embodiments of the present application and are not intended to limit the patent scope of the present application. Any equivalent structural transformation made under the inventive concept of this application using the contents of the description and drawings of this application, or directly/indirectly applied to other related technical fields, shall be included in the scope of patent protection of this application.

What is claimed is:

1. A pallet truck for transporting window-shaped pallets, comprising:
- a forklift body;
- a fork arm assembly, which is movably arranged on the forklift body, wherein the fork arm assembly has a movement stroke that moves up and down relative to the forklift body, and the fork arm assembly comprises two fork arms spaced apart along a width direction of the forklift body;
- two load-bearing wheels, which are movably arranged on each fork arm respectively, wherein in an up and down direction, the load-bearing wheels have a movement stroke close to and away from the fork arm;
- wherein the fork arm assembly further comprises a sliding plate, the sliding plate is movably arranged on the forklift body, and the fork arms are arranged on the sliding plate; and
- the pallet truck transporting window-shaped pallets further comprises a first driving assembly, the first driving assembly comprises a first fixing part and a first telescopic part that moves relatively up and down, and the first fixing part is fixed on the forklift body, the first telescopic part is fixedly connected to the sliding plate.

2. The pallet truck for transporting window-shaped pallets according to claim 1, wherein the first driving assembly comprises a first hydraulic cylinder, the first fixing part comprises a cylinder seat of the first hydraulic cylinder, and the first telescopic part comprises a telescopic rod of the first hydraulic cylinder.

3. The pallet truck for transporting window-shaped pallets according to claim 1, further comprising a first guiding assembly to provide guidance for the sliding plate to move up and down along the forklift body.

4. The pallet truck for transporting window-shaped pallets according to claim 3, wherein the pallet truck for transporting window-shaped pallets also comprises two first guiding blocks arranged at intervals along the forklift body, and a first guiding groove is formed on the opposite side of each first guiding block that penetrates up and down;
- the pallet truck for transporting window-shaped pallets also comprises two first pulley mounting plates, wherein the two first pulley mounting plates are arranged along a width direction of the sliding plate at intervals where the sliding plate is away from the fork arm, wherein a first guiding wheel set adapted to the first guiding groove is provided on the opposite side of the first pulley mounting plate, and the first guiding wheel set is clamped in the first guiding groove;
- the first guiding assembly comprises the first guiding groove and the first guiding wheel set.

5. The pallet truck for transporting window-shaped pallets according to claim 1, wherein further comprising a second driving assembly, the second driving assembly comprises a driving part for driving the load-bearing wheels closer to and away from the fork arm in an up and down direction;
- the second driving assembly comprises:
- a driving part, the driving part comprises a second fixing part and a second telescopic part that can move relatively up and down, and the second fixing part is fixed on the forklift body;
- a transmission structure, which is movably arranged at bottom of the fork arm, wherein the transmission structure comprises a driving end and a connecting end spaced apart from each other, the driving end is configured to drively connect with the second fixing part; and
- a load-bearing wheel frame, which is rotatably connected to the connecting end of the transmission structure, and the load-bearing wheel is rotatably mounted on the load-bearing wheel frame.

6. The pallet truck for transporting window-shaped pallets according to claim 5, wherein the transmission structure comprises:
- a lifting arm, which is hingedly connected to the fork arm, and the connecting end is formed on the lifting arm;
- a connecting arm, which is hingedly connected to the fork arm, and spaced apart from the lifting arm along a length direction of the fork arm;
- a pushing rod, one end of which is fixedly connected to a side of the lifting arm away from the load-bearing wheel, and another end is connected to the connecting arm; and
- a traction block, which is movably arranged on the forklift body in an up and down direction, wherein one end of the traction block is rotationally connected to the pushing rod, and the driving end is formed on a side of the traction block away from the pushing rod.

7. The pallet truck for transporting window-shaped pallets according to claim 6, wherein further comprising a second guiding assembly to provide guidance for movement of the traction block.

8. The pallet truck for transporting window-shaped pallets according to claim 7, wherein the second guiding assembly comprises:
- two second guiding blocks, which are arranged on the forklift body at intervals along the width direction of the forklift body, and second guiding grooves extending up and down are formed on an opposite sides of each of the second guiding blocks; and two second guiding wheel sets, corresponding to the second guiding grooves, and are rotatably arranged on opposite sides of the traction block, and the traction block is clamped in the second guiding groove through the second guiding wheel set.

9. The pallet truck for transporting window-shaped pallets according to claim 5, wherein the driving part comprises a second hydraulic cylinder, the second fixing part comprises a cylinder seat of the second hydraulic cylinder, and the second telescopic part comprises a telescopic rod of the second hydraulic cylinder.

* * * * *